(12) United States Patent
Jung et al.

(10) Patent No.: US 9,001,519 B2
(45) Date of Patent: Apr. 7, 2015

(54) PROTECTIVE CIRCUIT MODULE AND BATTERY PACK HAVING THE SAME

(71) Applicant: Samsung SDI Co., Ltd., Yongin-si (KR)

(72) Inventors: Kwangsig Jung, Yongin-si (KR);
Doosun Hwang, Yongin-si (KR);
Jaeseung Ryu, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 129 days.

(21) Appl. No.: 13/659,687

(22) Filed: Oct. 24, 2012

(65) Prior Publication Data

US 2013/0335935 A1 Dec. 19, 2013

(30) Foreign Application Priority Data

Jun. 19, 2012 (KR) .................. 10-2012-0065820

(51) Int. Cl.
*H05K 7/06* (2006.01)
*H01M 2/34* (2006.01)
*H01M 10/42* (2006.01)
*H01M 10/04* (2006.01)

(52) U.S. Cl.
CPC ............ *H01M 2/34* (2013.01); *H01M 10/0436* (2013.01); *H01M 10/4264* (2013.01); *H01M 2200/106* (2013.01)

(58) Field of Classification Search
USPC .......... 361/760, 761, 763, 764, 766; 320/127, 320/134–136
See application file for complete search history.

(56) References Cited

U.S. PATENT DOCUMENTS

| | | | |
|---|---|---|---|
| 7,379,751 B2* | 5/2008 | Wada et al. ............... 455/552.1 |
| 7,781,089 B2* | 8/2010 | Tan et al. ..................... 429/65 |
| 8,427,840 B2* | 4/2013 | Chen et al. ................... 361/783 |
| 2006/0250731 A1* | 11/2006 | Parkhurst et al. ............... 361/56 |
| 2008/0094032 A1* | 4/2008 | Miyamoto et al. ........... 320/134 |
| 2009/0142946 A1 | 6/2009 | Lu |
| 2011/0299209 A1* | 12/2011 | Tajima et al. ................ 361/104 |

FOREIGN PATENT DOCUMENTS

| | | | |
|---|---|---|---|
| JP | 2006-172942 A | 6/2006 |
| JP | 2007-323909 A | 12/2007 |

* cited by examiner

*Primary Examiner* — Angel R Estrada
*Assistant Examiner* — Dimary Lopez Cruz
(74) *Attorney, Agent, or Firm* — Knobbe Martens Olson & Bear, LLP

(57) ABSTRACT

A protective circuit module and a battery pack having the same are disclosed. In one embodiment, the protective circuit module includes a printed circuit board, an electronic device mounted on a first surface of the printed circuit board, and a pattern part mounted on a second surface opposite to the first surface of the printed circuit board. The electronic device comprises an integrated circuit chip, and one or more electronic components electrically connected to the integrated circuit chip and at least one of the one or more electronic components is electrically connected to the pattern part.

8 Claims, 9 Drawing Sheets

PROTECTIVE CIRCUIT MODULE AND BATTERY PACK HAVING THE SAME

CROSS-REFERENCE TO RELATED APPLICATION

This application claims priority to and the benefit of Korean Patent Application No. 10-2012-0065820, filed on Jun. 19, 2012, the entire content of which is incorporated herein by reference.

BACKGROUND

1. Field

The disclosed technology relates to a protective circuit module and a battery pack having the same.

2. Description of the Related Technology

In general, lithium based secondary batteries, such as lithium ion or lithium polymer secondary batteries, have a higher energy density and less than conventional lead, nickel-cadmium, or nickel-hydrogen batteries, and are typically used as power supply sources of portable electronic devices, such as smartphones, mobile phones, notebook computers, electronic tools or the like.

However, when lithium based secondary batteries are misused, for example, in the event of penetration, compression, external short, over-charge, over-discharge, over-current, heating, drop, or cutting, they are highly vulnerable to disruption because of their unstable chemical composition. Accordingly, in order to protect lithium based secondary batteries from over-charge, over-discharge, or over-current and to prevent battery performance from being lowered, a battery pack needs a protective circuit module.

SUMMARY OF CERTAIN INVENTIVE ASPECTS

Embodiments described herein relate to a protective circuit module, which can minimize influences of externally induced electromagnetic waves and static electricity, and a battery pack having the same.

According to one aspect, a protective circuit module is provided, including a printed circuit board having a first and a second surface, the first surface being disposed opposite the second surface, an electronic device comprising an integrated circuit chip mounted on the first surface of the printed circuit board; one or more electronic components electrically connected to the integrated circuit chip; and a pattern part mounted on the second surface of the printed circuit board, wherein at least one of the one or more electronic components is electrically connected to the pattern part.

The pattern part may include a ground pattern for grounding. The one or more electronic components may be connected to the pattern part through a conductive via. The at least one electronic components may include a first capacitor, and the first capacitor may be connected between a power supply terminal of the integrated circuit chip and the pattern part. The electronic device may further include a connector including one or more electrode pads to be connected to an external charging device, and a second capacitor electrically connected between one of the one or more electrode pads of the connector and the pattern part. The one or more electrode pads may include positive or negative electrode pads.

In another aspect, a protective circuit module comprises, a first printed circuit board comprising an integrated circuit chip and one or more electronic devices including one or more electronic components electrically connected to the integrated circuit chip; and a second printed circuit board disposed to be spaced apart from the first printed circuit board and having a pattern part electrically connected to the one or more electronic components. In some embodiments, the first printed circuit board comprises a first surface and a second surface, wherein the integrated circuit chip and the one or more electronic devices are disposed on the first surface, and one or more electrode pads are disposed on the second surface.

In some embodiments, the pattern part of the second printed circuit board comprises a ground pattern.

According to another aspect, a battery pack having a protective circuit module includes a battery cell including one or more electrode terminals, and a protective circuit module electrically connected to the one or more electrode terminals of the battery cell, wherein the protective circuit module includes a first printed circuit board on which an electronic device is mounted, the electronic device including an integrated circuit chip and one or more electronic components electrically connected to the integrated circuit chip, and a second printed circuit board disposed to be spaced apart from the first printed circuit board and having a pattern part electrically connected to the one or more electronic components, the electronic device includes an integrated circuit chip, and one or more electronic components electrically connected to the integrated circuit chip, and at least one of the one or more electronic components is electrically connected to the pattern part.

The one or more electronic components may comprise a first capacitor, and the first capacitor is connected between a power supply terminal of the integrated circuit chip and the pattern part. The electronic device may further include a connector including one or more electrode pads to be electrically connected to the battery cell, and a second capacitor electrically connected between one of the one or more electrode pads of the connector and the pattern part. The one or more electrode pads may include positive or negative electrode pads and the one or more electrode terminal include positive or negative electrode terminals.

As described above, according to an embodiment, a connector among electronic components mounted on a printed circuit board or a capacitor connected to an integrated circuit chip is connected to a ground pattern formed on a printed circuit board formed on a surface different from a surface having the connector or capacitor mounted thereon, thereby minimizing influences of externally induced electromagnetic waves and static electricity.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
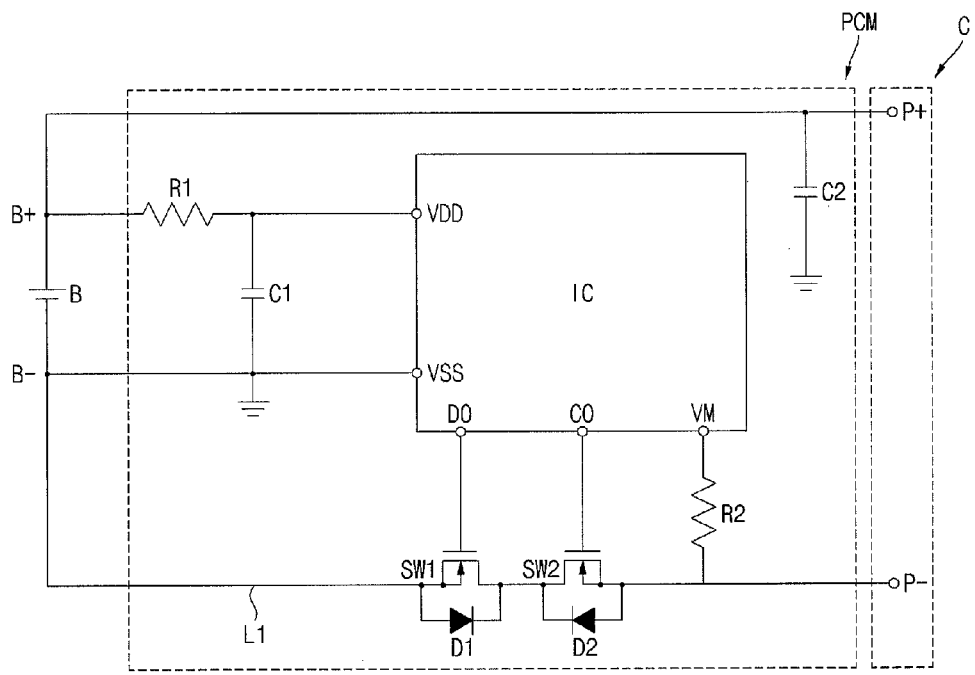
FIG. 1 a circuit diagram of an embodiment of a protective circuit module.

Reference will now be made in detail to the embodiments of the present disclosure, non-limiting examples of which are illustrated in the accompanying drawings such that they can easily be made and used by those skilled in the art.

Here, like reference numerals designate like elements throughout the specification. In the specification, where an element or component is said to be electrically connect another element or component, it should be understood that the element or component can be directly connected to the other element or component or intervening elements may also be present.

FIG. 1 is a circuit diagram of an exemplary protective circuit module. Referring to FIG. 1, a protective circuit module PCM includes an integrated circuit chip IC, a discharge control switch SW1, a charge control switch SW2, a first resistor R1, a second resistor R2, a first capacitor C1 and a second capacitor C2.

The integrated circuit chip IC, which is electrically connected to a secondary battery B, detects a voltage and a current of the secondary battery B and controls the discharge control switch SW1 or the charge control switch SW2 to prevent the secondary battery B from being over-discharged or over-charged or to prevent over-current from flowing through the secondary battery B.

The discharge control switch SW1, which is electrically connected between a charge/discharge line L1 and the integrated circuit chip IC, is turned off by a control signal of the integrated circuit chip IC when a voltage of the secondary battery B is lowered to a predetermined voltage or lower. In addition, when an over-current is supplied to the secondary battery B during discharging, the discharge control switch SW1 is turned off. Further, since a body diode D1 is connected in parallel to the discharge control switch SW1, the secondary battery B can be charged even when the discharge control switch SW1 is turned off.

The charge control switch SW2, which is electrically connected between the charge/discharge line L1 and the integrated circuit chip IC, is turned off by the control signal of the integrated circuit chip IC when a voltage of the secondary battery B is increased to a predetermined voltage or higher. In addition, when an over-current is supplied to the secondary battery B during charging, the charge control switch SW2 is turned off. Further, since a body diode D2 is connected in parallel to the charge control switch SW2, the secondary battery B can be discharged even when the charge control switch SW2 is turned off.

The first resistor R1, which is electrically connected between the secondary battery B and the integrated circuit chip IC, protects the integrated circuit chip IC from externally induced static electricity and allows power supplied to the integrated circuit chip IC to be maintained at a constant level.

The second resistor R2, which is electrically connected between the charge/discharge line L1 and the integrated circuit chip IC, senses a level of the current flowing through the charge/discharge line L1 and allows the integrated circuit chip IC to perform a proper protection control operation. For example, when a positive electrode pack terminal P+ and a negative electrode pack terminal P−, which constitute a connector C, are directly short-circuited, the second resistor R2 senses the short-circuit and then transmits the sensing result to the integrated circuit chip IC. Then, the integrated circuit chip IC turns off the discharge control switch SW1, thereby interrupting a high current flowing due to an external short.

The first capacitor C1 is electrically connected between the first resistor R1 and the secondary battery B, thereby suppressing fluctuation of power supplied to the integrated circuit chip IC.

The second capacitor C2 is electrically connected between the positive electrode pack terminal P+ and ground.

VDD denotes a power supply terminal, VSS denotes a ground terminal, DO denotes a gate connecting terminal of the discharge control switch SW1, CO denotes a gate connecting terminal of the charge control switch SW2, and VM denotes a connecting terminal of the second resistor R2.

The integrated circuit chip IC, the discharge control switch SW1, the charge control switch SW2, the first resistor R1, the second resistor R2, the first capacitor C1 and the second capacitor C2 may herein be described as electronic devices. In addition, the first resistor R1, the second resistor R2, the first capacitor C1 and the second capacitor C2 may be described herein as electronic components or passive elements. Generally, the electronic devices are mounted on a printed circuit board and are then electrically connected to each other.

Figure 2A:
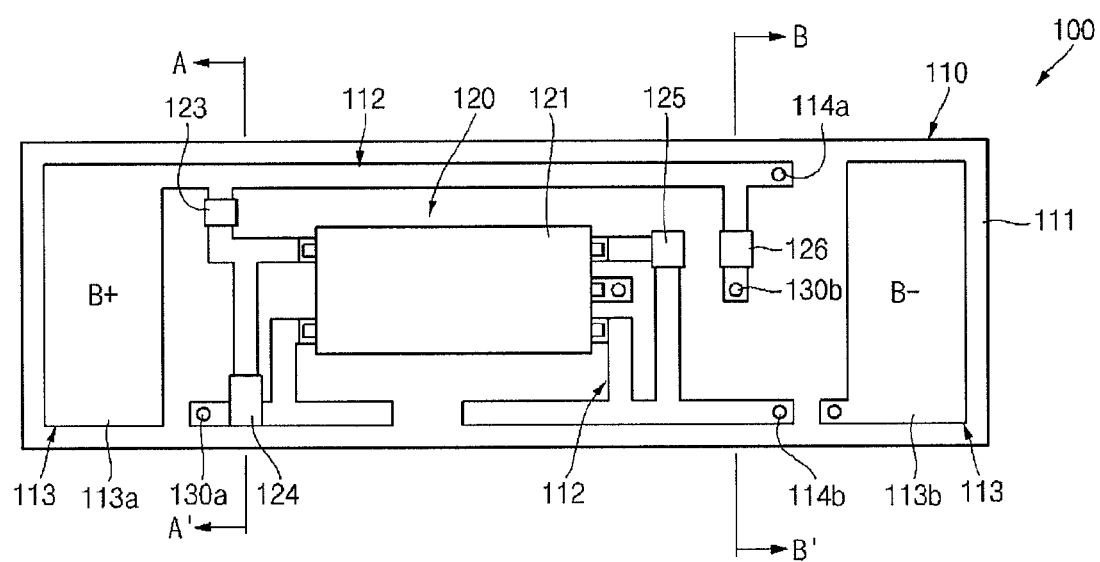
FIG. 2A is a plan view of a protective circuit module
Figure 2B:
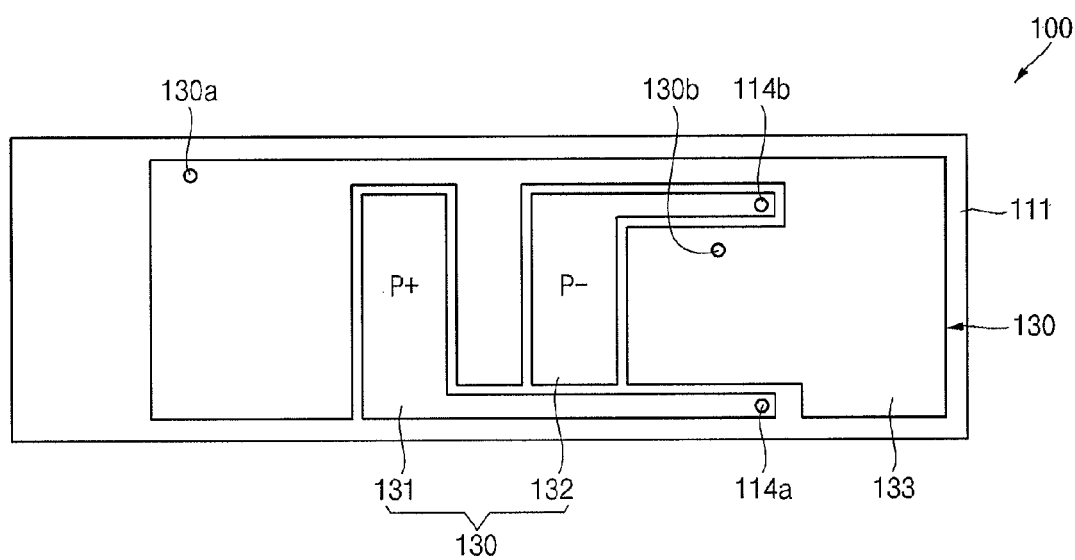
FIG. 2B is a bottom view of the protective circuit module shown in FIG. 2A.
Figure 3A:
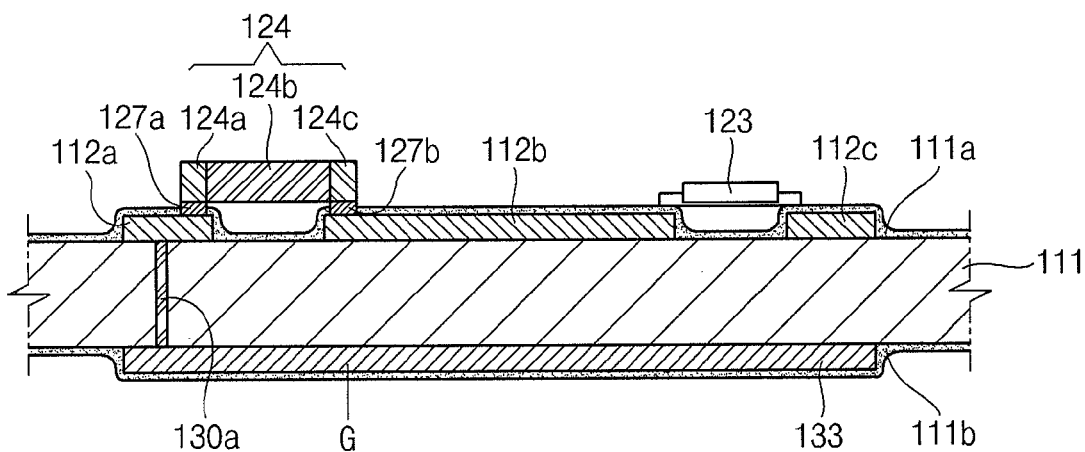
FIG. 3A is a cross-sectional view taken along the line A-A' of FIG. 2A.
Figure 3B:
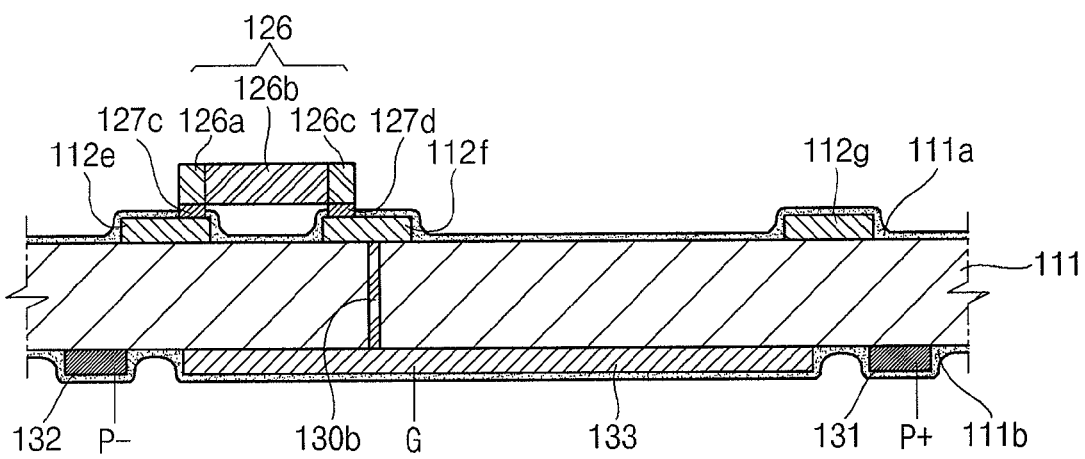
FIG. 3B is a cross-sectional view taken along the line B-B' of FIG. 2A.

FIG. 2A is a plan view of an embodiment of a protective circuit module and FIG. 2B is a bottom view of the protective circuit module shown in FIG. 2A. FIG. 3A is a cross-sectional view taken along the line A-A' of FIG. 2A and FIG. 3B is a cross-sectional view taken along the line B-B' of FIG. 2A.

Referring to FIGS. 2A to 3B, the protective circuit module (PCM) 100 includes a printed circuit board 110, an electronic device 120 mounted on a first surface of the printed circuit board 110, and a pattern part 130 formed on a second surface of the printed circuit board 110. The second surface is an opposite surface of the first surface.

The printed circuit board 110 includes an insulation layer 111 and a plurality of wiring patterns 112 and a plurality of electrode pads 113 formed on the insulation layer 111. The first surface and the second surface of the printed circuit board 110 may have protection layers 111a and 111b made of polymer resin.

The insulation layer 111 may be made of one selected from the group consisting of phenol resin, epoxy resin, polyimide and equivalents thereof, but the embodiments described herein are not limited thereto.

The wiring patterns 112 are formed on the first surface of the insulation layer 111 and may be generally made of copper or equivalents thereof, but the embodiments described are not limited thereto. The wiring patterns 112 are usually used as a charge/discharge line or are used to electrically connect the respective terminals of the electronic device 120.

The electrode pads 113 are formed on the first surface of the insulation layer 111 and include a battery positive electrode pad 113a and a battery negative electrode pad 113b. The electrode pads 113 are electrically connected to the wiring patterns 112. Positive electrode terminal B+ is electrically connected to the battery positive electrode pad 113a and a negative electrode terminal B− is electrically connected to the battery negative electrode pad 113b.

Electronic device 120 is formed on the first surface of the insulation layer 111 and the insulation layer 111 and is electrically connected to the wiring patterns 112. As described above, the electronic device 120 includes an integrated circuit chip 121, a discharge control switch, a charge control switch and a plurality of electronic components or passive elements. The passive elements may include a first resistor 123, a first capacitor 124, a second resistor 125 and a second capacitor 126, which are connected to a connecting terminal of an integrated circuit chip 121 through the plurality of wiring patterns 112.

The pattern part 130 is formed on the second surface of the insulation layer 111 and include a pack positive electrode pad 131, a pack negative electrode pad 132 and a ground pattern 133. The pack positive electrode pad 131 and the pack negative electrode pad 132 are electrically connected to the wiring patterns 112 through conductive vias 114a and 114b penetrating the insulation layer 111. The ground pattern 133 is electrically connected to the first capacitor 124 and the second capacitor 126 through the conductive vias 130a and 130b penetrating the insulation layer 111.

The first capacitor 124 and the second capacitor 126 electrically connections to the ground pattern 133 of the pattern part 130 will now be described in more detail.

The first capacitor 124 includes a first terminal 124a, an element part 124b and a second terminal 124c. Here, the first terminal 124a and the second terminal 124c of the first capacitor 124 are mounted on wiring patterns 112a and 112b formed on the insulation layer 111 through solders 127a and 127b. The first terminal 124a is electrically connected to the ground pattern 133. Since the first terminal 124a and the ground pattern 133 are formed on different planes, they are electrically connected to each other through the conductive via 130a penetrating the insulation layer 111 between the first terminal 124a and the ground pattern 133. In addition, the second terminal 124c is electrically connected to a power supply terminal VDD of the integrated circuit chip 121. Here, the second terminal 124c and the power supply terminal VDD of the integrated circuit chip 121 are connected to each other on the same plane. When the first terminal 124a and the ground pattern 133 are connected to each other on the same plane, if electromagnetic waves and static electricity are externally induced through the negative electrode pack terminal 132 of the connector, a high current is induced to the ground terminal VSS of the integrated circuit chip 121, and the integrated circuit chip 121 may not operate normally. As described herein, the first terminal 124a of the first capacitor 124 is connected to the ground pattern 133 formed on a surface different from a surface having the integrated circuit chip 121. Accordingly, when electromagnetic waves and static electricity are externally induced through the negative electrode pack terminal 132 of the connector, a current induced to the ground terminal VSS of the integrated circuit chip 121 can be greatly reduced.

Like the first capacitor 124, the second capacitor 126 may also include a first terminal 126a, an element part 126b and a second terminal 126c. The first terminal 126a and the second terminal 126c of the second capacitor 126 are mounted on wiring patterns 112e and 112f formed on the insulation layer 111 through solders 127c and 127c. The first terminal 126a is electrically connected to the positive electrode pack terminal 131 of the connector. Since the first terminal 126a and the positive electrode pack terminal 131 of the connector are formed on different planes, they are electrically connected to each other through the conductive via 114a penetrating the insulation layer 111 positioned between the first terminal 126a and the positive electrode pack terminal 131. In addition, the second terminal 126c is electrically connected to the ground pattern 133. Since the second terminal 126c and the ground pattern 133 are formed on different planes, they are electrically connected to each other through the conductive via 130a penetrating the insulation layer 111 positioned between the second terminal 126c and the ground pattern 133. In addition, the ground pattern 133 is connected to the ground terminal VSS of the integrated circuit chip 121. Meanwhile, in a case where the second terminal 126c and the ground pattern 133 are connected to each other on different planes, if electromagnetic waves and static electricity are externally induced through the positive electrode pack terminal 131 of the connector, a high current is induced to the ground terminal VSS of the integrated circuit chip 121, and the integrated circuit chip 121 may not operate normally. The second terminal 126c of the second capacitor 126 is connected to the ground pattern 133 formed on a surface different from a surface having the integrated circuit chip 121. Accordingly, when electromagnetic waves and static electricity are externally induced through the positive electrode pack terminal 131 of the connector, a current induced to the ground terminal VSS of the integrated circuit chip 121 can be greatly reduced.

Therefore, embodiments of the protective circuit module described herein have a robust structure against negative effects due to external electromagnetic waves and static electricity.

Figure 4A:
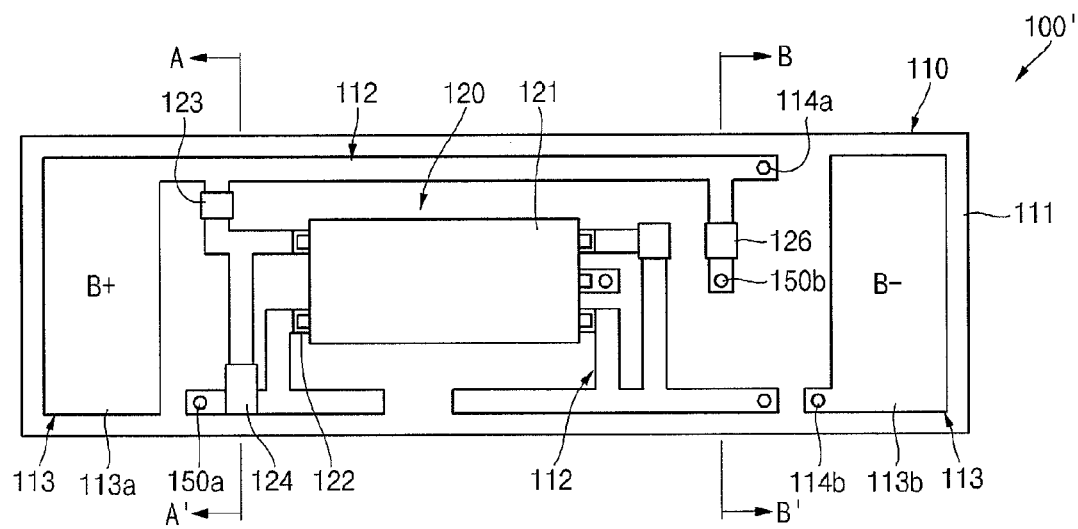
FIG. 4A is a plan view of an embodiment of a protective circuit module.
Figure 4B:
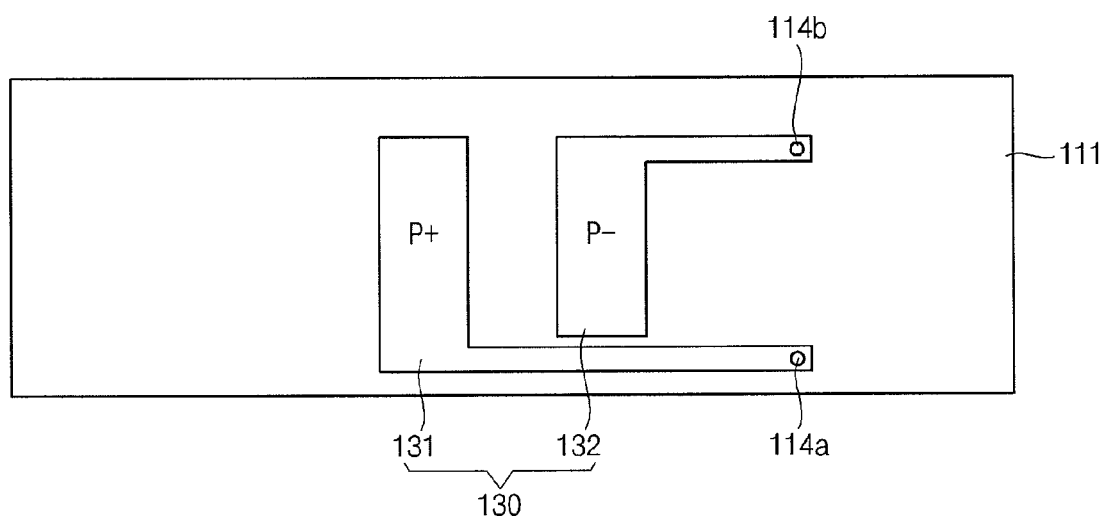
FIG. 4B is a bottom view of a first printed circuit board of the protective circuit module shown in FIG. 4A.
Figure 4C:
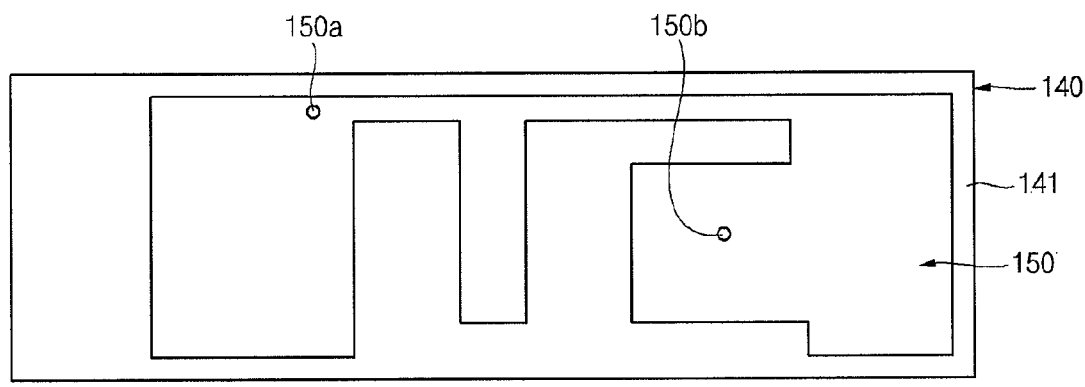
FIG. 4C is a bottom view of a second printed circuit board of the protective circuit module shown in FIG. 4A.
Figure 5A:
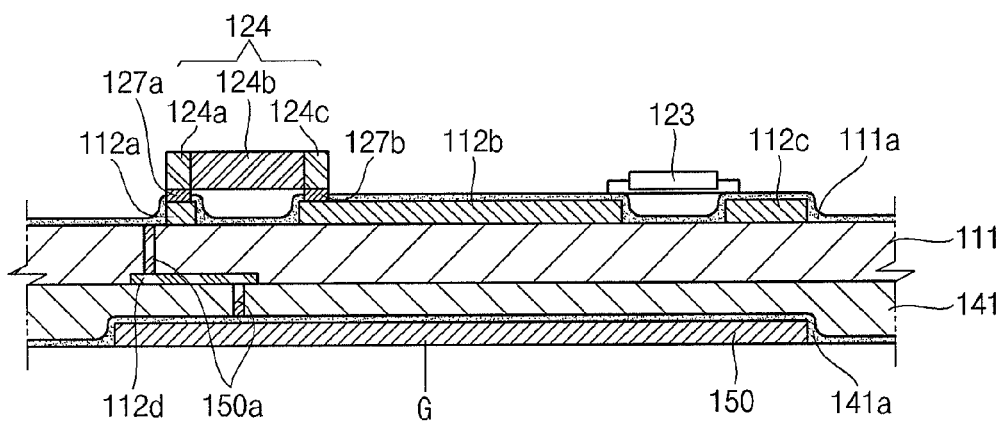
FIG. 5A is a cross-sectional view taken along the line A-A' of FIG. 4A.
Figure 5B:
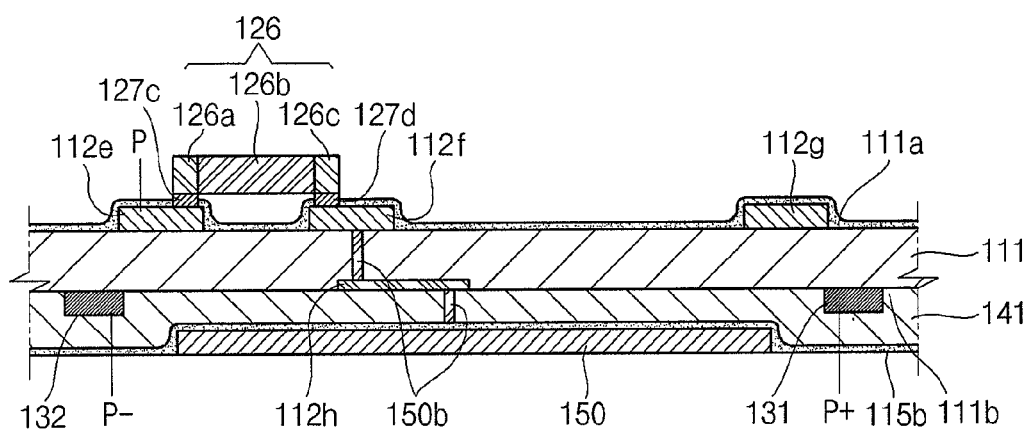
FIG. 5B is a cross-sectional view taken along the line B-B' of FIG. 4A.
Figure 6:
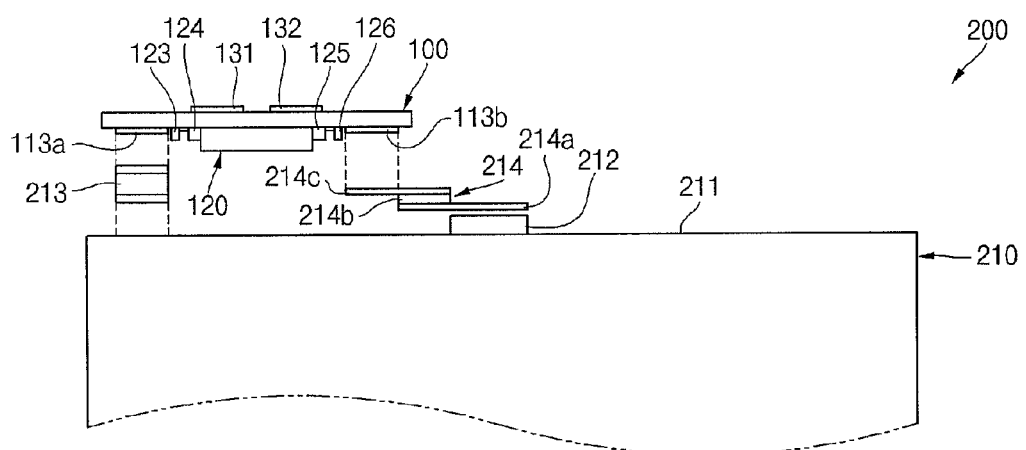
FIG. 6 is an exploded view illustrating an embodiment of a battery pack including a protective circuit module.

FIG. 4A is a plan view of an embodiment of a protective circuit module 100'. FIG. 4B is a bottom view of a first printed circuit board of the protective circuit module shown in FIG. 4A, and FIG. 4C is a bottom view of a second printed circuit board of the protective circuit module. FIG. 5A is a cross-sectional view taken along the line A-A' of FIG. 4A and FIG. 5B is a cross-sectional view taken along the line B-B' of FIG. 4A, and FIG. 6 is an exploded view illustrating an exemplary battery pack including a protective circuit module according to still another embodiment.

The first printed circuit board 110 includes an electronic device 120 mounted on a first surface of the first insulation layer 111 and a pack electrode pad 130 formed on a second surface of the first insulation layer 111. A predetermined conductive wiring pattern 112d is formed on the second surface of the first insulation layer 111. Here, the second surface is an opposite surface of the first surface.

A protection layer 111a made of polymer resin may be formed on the first surface of the first printed circuit board 110.

The pack electrode pad 130 is formed on the second surface of the first insulation layer 111 and includes a pack positive electrode pad 131 and a pack negative electrode pad 132. The pack positive electrode pad 131 and the pack negative electrode pad 132 are electrically connected to the wiring patterns 112 through conductive vias 114a and 114b penetrating the first insulation layer 111.

Referring to FIG. 4C, the second printed circuit board 140 includes a ground pattern 150 formed on a surface of the second insulation layer 141. The second printed circuit board is disposed to be spaced apart from the first printed circuit board and is configured to have a pattern part electrically connected to the electrical components disposed on the first circuit board. The ground pattern 150 is electrically connected to the first capacitor 124 and the second capacitor 126 through conductive vias 150a and 150b penetrating the first insulation layer 111 and the second insulation layer 141. Here, the conductive vias 150a and 150b are electrically connected to each other by a conductive wiring pattern 112d formed on the second surface of the first insulation layer 111. The ground pattern 150 may also be electrically connected to ground (not shown).

Referring to FIG. 5A, the first capacitor 124 includes a first terminal 124a, an element part 124b and a second terminal 124c. The first terminal 124a is electrically connected to the ground pattern 150. Since the first terminal 124a and the ground pattern 133 are formed on different insulation layers 111 and 141, they are electrically connected to each other through the conductive via 150a penetrating the first insulation layer 111 between the first terminal 124a and the ground pattern 150. In addition, the second terminal 124c is electrically connected to a power supply terminal VDD of the integrated circuit chip 121. Here, the second terminal 124c and the power supply terminal VDD of the integrated circuit chip 121 are connected to each other on the same plane. The first terminal 124a of the first capacitor 124 is connected to the ground pattern 150 of the second insulation layer 141 different from the first insulation layer 111 having the integrated circuit chip 121. Second insulation layer 141 may have a protective coating 141a. As depicted, the first printed circuit board 110 may be spaced apart from second printed circuit board 140 by insulation layers 111 and 141, where insulation layers 111 and 141 are in direct contact. In some embodiments, insulation layer 111 may be in direct contact with protective layer 141a. In some embodiments, first printed circuit board 110 and second circuit board 140 may be spaced apart, separated by an air gap. Accordingly, when electromagnetic waves and static electricity are externally induced through the negative electrode pack terminal 132 of the connector, a current induced to the ground terminal VSS of the integrated circuit chip 121 can be greatly reduced.

Referring to FIG. 5B, like the first capacitor 124, the second capacitor 126 may also include a first terminal 126a, an element part 126b and a second terminal 126c. The first terminal 126a is electrically connected to the positive electrode pack terminal 131 of the connector. Since the first terminal 126a and the positive electrode pack terminal 131 of the connector are formed on different planes, they are electrically connected to each other through the conductive via 114a penetrating the insulation layer 111 positioned between the first terminal 126a and the positive electrode pack terminal 131. In addition, the second terminal 126c is electrically connected to the ground pattern 150. Since the second terminal 126c and the ground pattern 150 are formed on the insulation layers 111 and 141, respectively, which are different layers, they are electrically connected to each other through the conductive via 150b penetrating the first insulation layer 111 and the second insulation layer 141 positioned between the second terminal 126c and the ground pattern 150. In some embodiments, insulation layer 140 may have a protective layer 115b. The second terminal 126c of the second capacitor 126 is connected to the ground pattern 150 of the second insulation layer 141 different from the first insulation layer 111 having the integrated circuit chip 121. Accordingly, when electromagnetic waves and static electricity are externally induced through the positive electrode pack terminal 131 of the connector, a current induced to the ground terminal VSS of the integrated circuit chip 121 can be greatly reduced.

Therefore, the protective circuit module 100' has a robust structure against external electromagnetic waves and static electricity.

FIG. 6 is an exploded view illustrating an exemplary battery pack including a protective circuit module according to still another embodiment.

Referring to FIG. 6, the protective circuit modules 100 and 100' according to the previous embodiments are electrically connected to a prismatic battery cell 210, thereby implementing a prismatic battery pack 200. Each of the embodiments of protective circuit modules 100 and 100' as shown in FIGS. 2A to 5B may be used as the protective circuit module 100, thereby minimizing influences of external electromagnetic waves and static electricity. For example, where a first terminal 124a of a first capacitor 124 provided in the protective circuit module 100 is connected to a ground pattern 133 or 150 formed on a surface (or an insulation layer) different from a surface having an integrated circuit chip 121, the current induced to a ground terminal VSS of the integrated circuit chip 121 can be reduced by up to about 95%, compared to a case where the first terminal 124a is connected to the ground pattern formed on the same surface as that having the integrated circuit chip 121. In addition, in a case where a second terminal 126a of a second capacitor 126 provided in the protective circuit module 100 is connected to a ground pattern 133 or 150 formed on a surface (or an insulation layer) different from a surface having an integrated circuit chip 121, about 45% of the current induced to a ground terminal VSS of the integrated circuit chip 121 can be reduced, compared to a case where the second terminal 126a is connected to the ground pattern formed on the same surface on which the integrated circuit chip 121 is located.

In the prismatic battery cell 210, where a battery case 211 has, for example, a positive polarity, a conductive connector 213 is disposed between the case 211 and the battery positive electrode pad 113a of protective circuit module 100 or 100', thereby connecting the battery positive electrode pad 113a of the protective circuit module 100 to each other. In addition, a thermal safety device (e.g., a positive temperature coefficient (PTC) assembly) 214 may be interposed between a negative electrode terminal 212 of the prismatic battery cell 210 and battery negative electrode pad 113b of the protective circuit module 100, thereby connecting the negative electrode terminal 212 of the prismatic battery cell 210 and battery negative electrode pad 113b of the protective circuit module 100 or 100' to each other. Here, the thermal safety device (e.g., PTC assembly) 214 includes a first lead plate 214a connected to the negative electrode terminal 212, a thermal safety component (e.g., a PTC element) 214b connected to the first lead plate 214a, and a second lead plate 214c connected to the thermal safety component (e.g., PTC element) 214b and to the battery negative electrode pad 113b.

Here, resin (not shown) may be interposed between the protective circuit module 100 and the prismatic battery cell 210. The resin may surround all of regions other than the pack positive electrode pad 131 and the pack negative electrode pad 132 of the protective circuit module 100.

Figure 7:
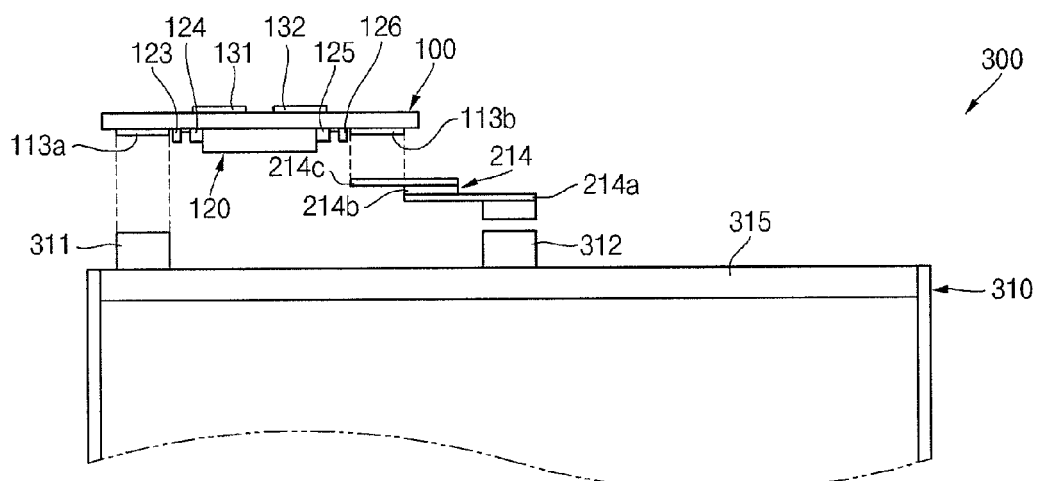
FIG. 7 is an exploded view of an embodiment of a battery pack including a protective circuit module.

FIG. 7 is an exploded view illustrating another exemplary battery pack including a protective circuit module according to an another embodiment.

As shown in FIG. 7, the protective circuit modules 100 and 100' according to the previous embodiments are electrically connected to a pouch type battery cell 310, thereby implementing a pouch type battery pack 300. As described above, each of the embodiments of protective circuit modules 100 and 100' shown in FIGS. 2A to 5B may be as the protective circuit module 100 depicted in FIG. 7, thereby minimizing influences of external electromagnetic waves and static electricity. In addition, a positive electrode cell tab 311 of the pouch type battery cell 310 and a battery positive electrode pad 113a of the protective circuit module 100 may be directly electrically connected to each other. A thermal safety device (e.g., a positive temperature coefficient (PTC) assembly) 214 may be interposed between a negative electrode cell tab 312 of the pouch type battery cell 310 and battery negative electrode pad 113b of the protective circuit module 100, thereby connecting the negative electrode cell tab 312 of the pouch type battery cell 310 and the battery negative electrode pad 113b of the protective circuit module 100 to each other. Here, the thermal safety device (e.g., PTC assembly) 214 includes a first lead plate 214a connected to the negative electrode cell tab 312, a thermal safety component (e.g., a PTC element) 214b connected to the first lead plate 214a, and a second lead plate 214c connected to the thermal safety component (e.g., PTC element) 214b and to the battery negative electrode pad 113b.

Here, the positive electrode cell tab 311 and the negative electrode cell tab 312 may be bent so allow the protective circuit module 100 to be seated on a terrace part 315 provided in the pouch type battery cell 310.

While the above has been described in connection with what is presently considered to be practical exemplary embodiments, it is to be understood that the invention is not limited to the disclosed embodiments, but, rather is intended to cover various modifications and equivalent arrangements included within the spirit and scope of the appended claims.

What is claimed is:

1. A protective circuit module, comprising:
   a printed circuit board having a first and a second surface, the first surface being disposed opposite the second surface;
   an electronic device comprising an integrated circuit chip mounted on the first surface of the printed circuit board;
   one or more electronic components electrically connected to the integrated circuit chip; and
   a pattern part mounted on the second surface of the printed circuit board,
   wherein at least one of the electronic components is a first capacitor, the first capacitor connected between a power supply terminal of the integrated circuit chip and the pattern part.

2. The protective circuit module of claim 1, wherein the pattern part comprises a ground pattern for grounding.

3. The protective circuit module of claim 1, wherein electronic components are connected to the pattern part through a conductive via.

4. The protective circuit module of claim 1, wherein the electronic device further comprises:
   a connector including one or more electrode pads to be connected to an external charging device; and
   a second capacitor electrically connected between one of the electrode pads of the connector and the pattern part.

5. The protective circuit module of claim 4, wherein the electrode pads include positive or negative electrode pads.

6. A protective circuit module comprising,
   a first printed circuit board comprising an integrated circuit chip and one or more electronic devices including one or more electronic components electrically connected to the integrated circuit chip; and
   a second printed circuit board disposed to be spaced apart from the first printed circuit board and having a pattern part electrically connected to the one or more electronic components; and
   wherein at least one of the electronic components is a first capacitor, the first capacitor connected between a power supply terminal of the integrated circuit chip and the pattern part.

7. The protective circuit module of claim 6, wherein the first printed circuit board comprises a first surface and a second surface, wherein the integrated circuit chip and the electronic devices are disposed on the first surface,
   wherein one or more electrode pads are disposed on the second surface.

8. The protective circuit module of claim 6, wherein the pattern part of the second printed circuit board comprises a ground pattern.

* * * * *